(12) United States Patent
Niebauer et al.

(10) Patent No.: US 7,458,753 B1
(45) Date of Patent: Dec. 2, 2008

(54) ROUND CUTTING INSERT WITH CHIP CONTROL FEATURE

(75) Inventors: Kenneth L. Niebauer, Ligonier, PA (US); Keith R. Zack, Homer City, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/821,708

(22) Filed: Jun. 25, 2007

(51) Int. Cl.
*B23B 27/00* (2006.01)
*B23B 27/22* (2006.01)

(52) U.S. Cl. .................. 407/113; 407/114; 407/115; 407/116

(58) Field of Classification Search ......... 407/113–119, 407/11, 53, 57, 59, 67–70, 120
See application file for complete search history.

(56) References Cited

U.S. PATENT DOCUMENTS

| | | | |
|---|---|---|---|
| 4,606,678 A | 8/1986 | Zweekly | |
| 5,525,016 A | 6/1996 | Paya et al. | |
| 5,743,681 A * | 4/1998 | Wiman et al. | 407/114 |
| 5,934,844 A * | 8/1999 | Woolley | 407/114 |
| 6,164,878 A * | 12/2000 | Satran et al. | 407/113 |
| 6,692,199 B2 | 2/2004 | Andersson et al. | |
| 7,121,772 B2 | 10/2006 | Krahula et al. | |
| 2003/0210961 A1 | 11/2003 | Arvidsson | |

* cited by examiner

*Primary Examiner*—Willmon Fridie
(74) *Attorney, Agent, or Firm*—Larry R. Meenan, Esq.

(57) ABSTRACT

A round cutting insert includes a bottom surface, a clearance side surface and a top surface. The top surface includes a chip control feature in the form of a continuous, circumferential depression formed by a substantially planar bottom surface and a pair of upward sloping substantially planar side walls that form an angle with respect to the top surface. The chip control feature may also include a plurality of radially offset bumps located in the depression. The bumps may have the same size and shape, or may have a different size and shape. The top surface also includes an elevated island having one or more indexing marks for easy indexing of the cutting insert.

16 Claims, 8 Drawing Sheets

ROUND CUTTING INSERT WITH CHIP CONTROL FEATURE

BACKGROUND OF THE INVENTION

Round cutting inserts may often manage a number of profiling operations from fine machining to rough machining. Usually, the round cutting inserts generate a fine surface also in connection with high feeding since the round edge functions as a wiper. However, the chip control may easily become deficient, especially in connection with small cutting depths when relatively wide and thin chips are formed that could be hard to break. Thereby, long curled chips are formed that at worst may entangle around the insert holder and scratch the generated surface and possibly cause insert breakdown. Further, round inserts are afflicted with the inherent disadvantage that it is not possible to select an entering angle at a certain cutting depth because the insert is round. Thus, there is a need to provide a round insert with improved chip control for a desired entering angle and a desired cutting depth.

BRIEF SUMMARY OF THE INVENTION

Briefly, according to this invention, there is provided a round cutting insert comprising a bottom surface; a clearance side surface; and a top surface including a chip control feature in the form of a continuous, circumferential depression having a plurality of radially offset bumps located in the depression.

In another embodiment, a round cutting insert comprises a bottom surface; a clearance side surface; and a top surface including a chip control feature in the form of a continuous, circumferential depression comprising a substantially planar bottom surface, and a pair of upward sloping substantially planar side walls, each side wall forming an angle with respect to the top surface, and a plurality of bumps located in the depression.

In yet another embodiment, a round cutting insert comprises a bottom surface; a clearance side surface; and a top surface including a chip control feature in the form of a continuous, circumferential depression comprising a substantially planar bottom surface, and a pair of upward sloping substantially planar side walls, each side wall forming an angle with respect to the top surface, and a plurality of radially offset bumps located in the depression, the top surface further comprising an elevated island having one or more indexing marks for indexing the cutting insert.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
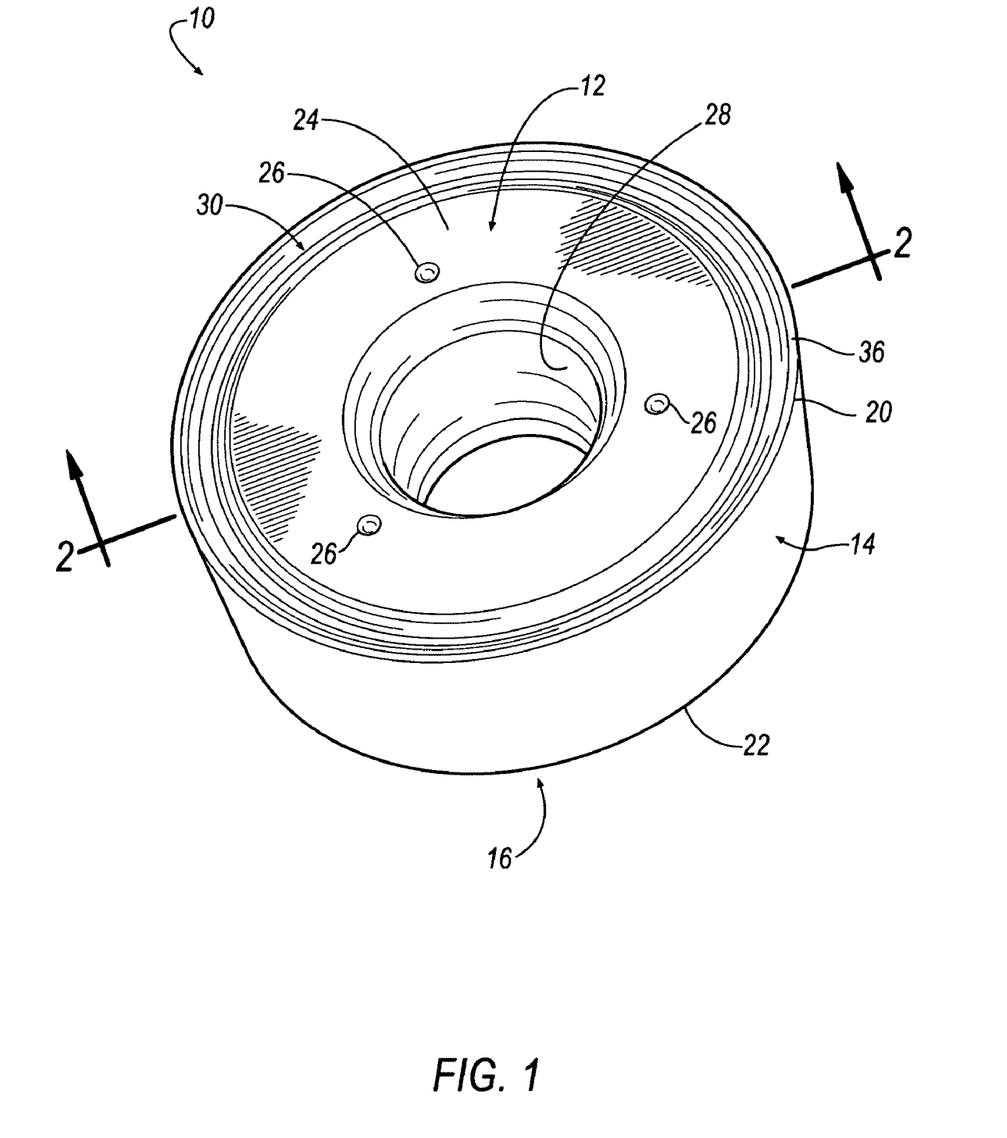
FIG. 1 is a perspective view of a round cutting insert with chip control feature according to an embodiment of the invention.
Figure 2:
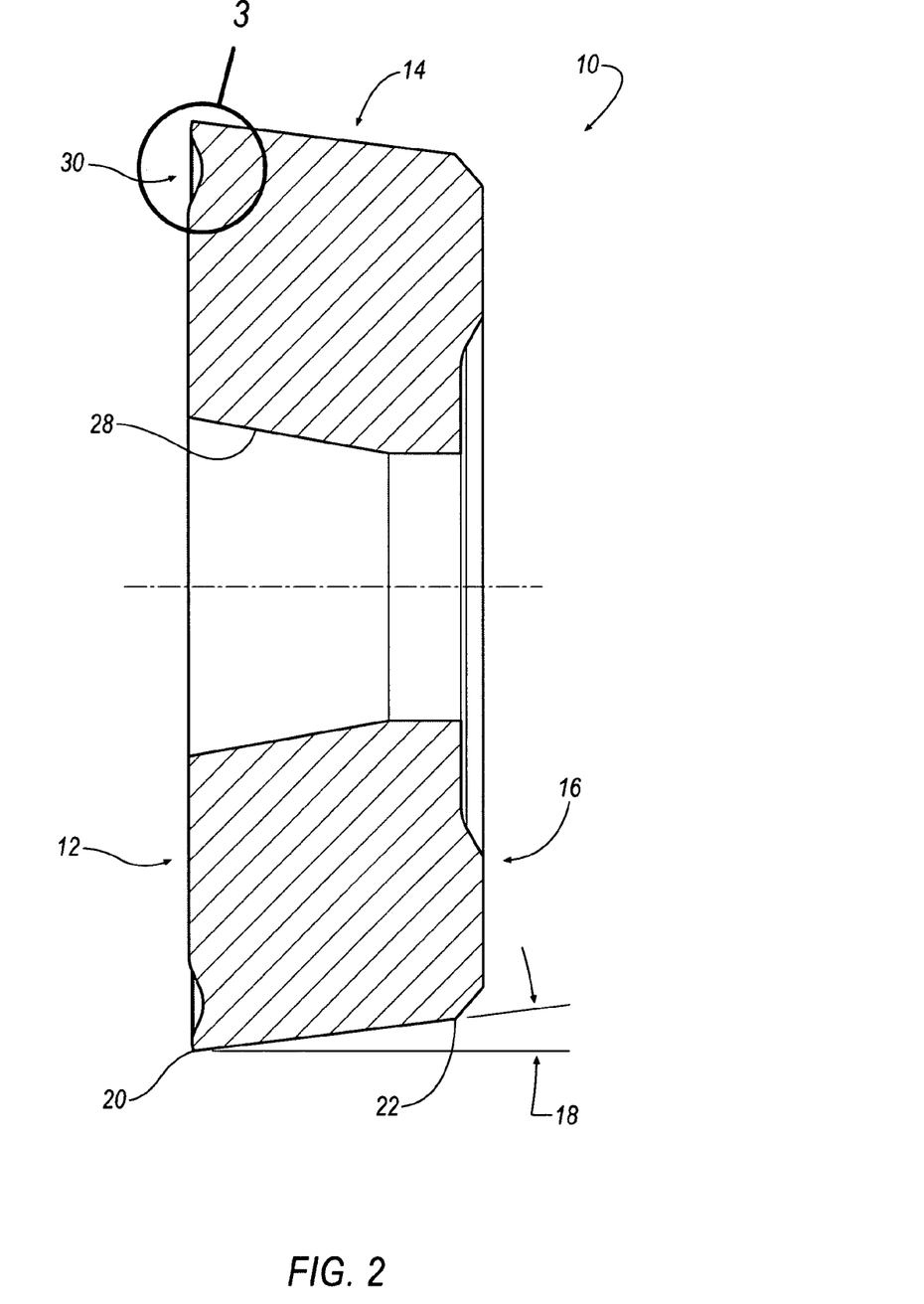
FIG. 2 is a cross-sectional view of the round cutting insert taken along line 2-2 of FIG. 1.
Figure 3:
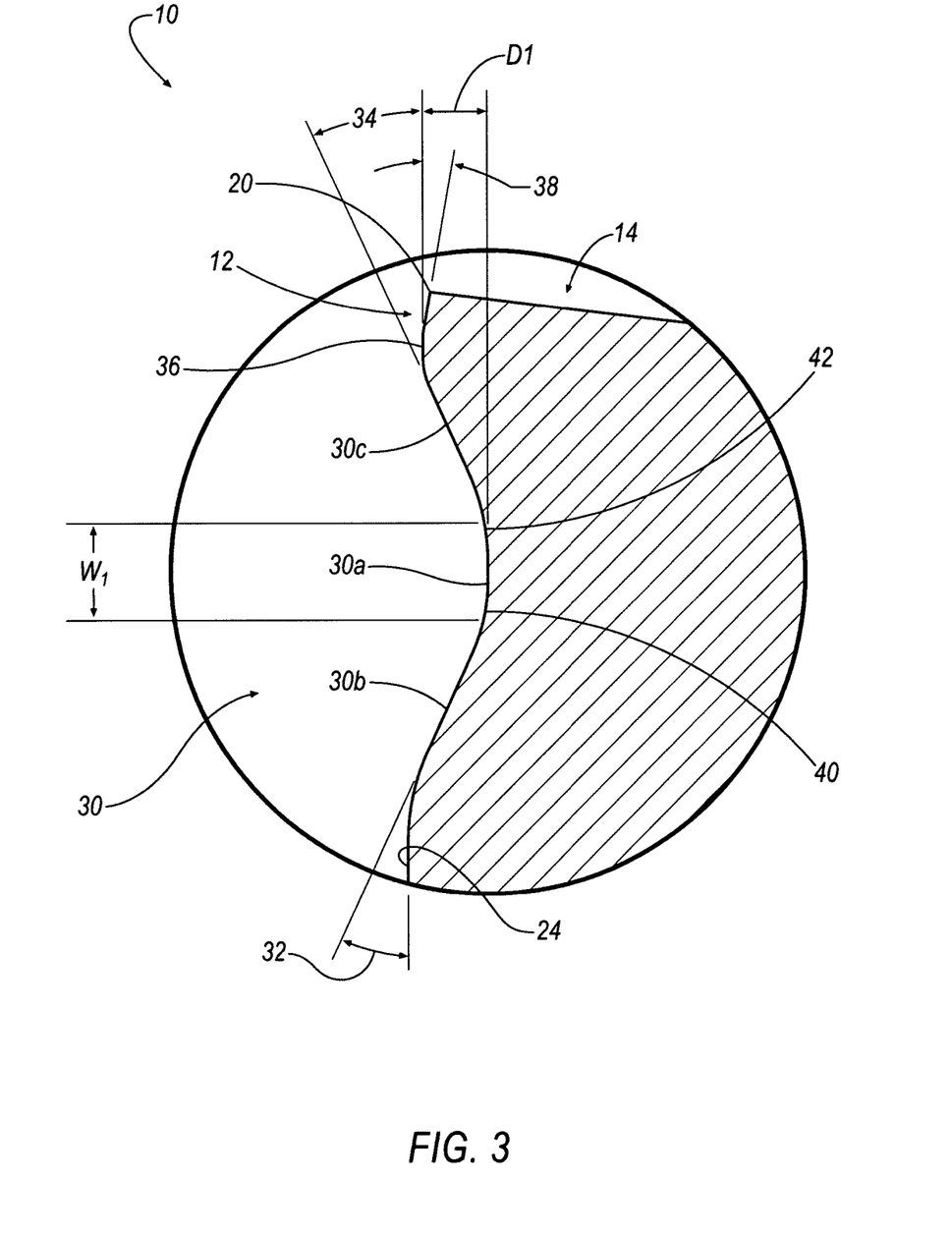
FIG. 3 is an enlarged view of the chip control feature of the round cutting insert of FIG. 1.

Referring now to FIGS. 1-3, a round cutting insert according to an embodiment is shown generally at 10. The insert 10 generally comprises a top surface 12, a clearance side surface 14 and a substantially planar bottom surface 16. The clearance side surface 14 forms a clearance angle 18 (FIG. 2) with respect to the top surface 12. In one embodiment, the clearance angle 18 may be equal to zero degrees such that the clearance side surface 14 is substantially perpendicular to the top surface 12 (and to the bottom surface 16). In order to provide sufficient clearance for most applications, the clearance angle 18 is between about +3 degrees and about +15 degrees, preferably between about +4 degrees and about +12 degrees, and most preferably about +7 degrees. It will be appreciated that the clearance angle 18 can be zero degrees to provide a double-sided insert.

Referring now to FIG. 2, the cutting insert 10 includes a substantially circular cutting edge 20 at the intersection between the top surface 12 and the clearance side surface 14 and a substantially circular bottom edge 22 at the intersection between the bottom surface 16 and the clearance side surface 14. In the illustrated embodiment, the clearance angle 18 is a positive value so that the diameter of the substantially circular cutting edge 20 is larger than the diameter of the circular bottom edge 22.

Referring back to FIG. 1, the top surface 12 includes a substantially planar island 24 that is slightly elevated with respect to the cutting edge 20. It will be appreciated that the island 24 may be lower in elevation with respect to the cutting edge 20 on negative inserts. The island 24 includes one or more indexing marks 26 that may be similar in shape or different in shape. In the illustrated embodiment, the island 24 includes three indexing marks 26 that are substantially identical in shape that are circumferentially positioned at equidistant intervals of about 120 degrees around the island 24. The indexing marks 26 are used to properly locate or index the cutting insert 10 at a desired position with respect to the toolholder (not shown). The cutting insert 10 may also includes a countersunk bore 28 for mounting the insert 10 to the toolholder (not shown).

Referring now to FIG. 3, the top surface 12 of the cutting insert 10 includes a chip control feature in the form of a continuous, circumferential depression, shown generally at 30. In the embodiment of FIG. 3, the depression 30 includes a substantially planar bottom surface 30a having a width W1, and a pair of upward sloping substantially planar side walls 30b, 30c. Each side wall 30b, 30c slopes upward at an angle 32, 34 with respect to the top surface 12, respectively. In the embodiment of FIG. 3, the angles 32, 34 are substantially identical to each other at about 25 degrees. However, the invention is not limited by the magnitude of the angles 32, 34, and the invention can be practiced at other angles. As seen in FIG. 3, the island 24 is slightly higher in elevation than the cutting edge 20. However, it will be appreciated that the island 24 can be slightly lower or the same in elevation as the cutting edge 20. A substantially flat downwardly sloping facet 36 forming an angle 38 with respect to the top surface 12 is interposed between the side wall 30c and the cutting edge 20. In the embodiment of FIG. 3, the angle 38 is approximately 10 degrees. The depression 30 may also include radii 40, 42 interposed between the bottom surface 30a and the side walls 30b, 30c, respectively. The radii 40, 42 provide a smooth transition between the bottom surface 30a and the side walls 30b, 30c.

Figure 4:
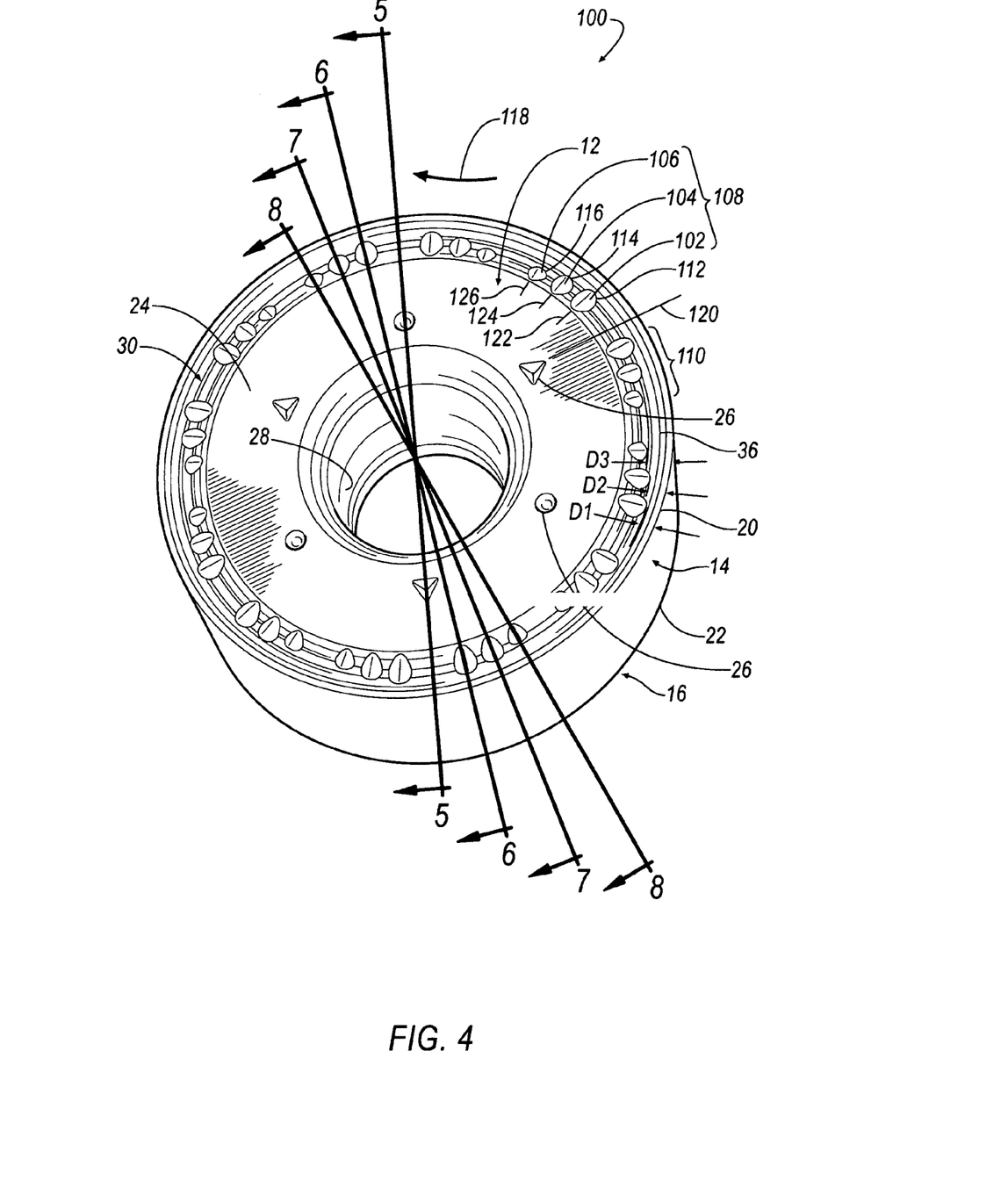
FIG. 4 is a perspective view of a round cutting insert with chip control feature according to another embodiment of the invention.
Figure 5:
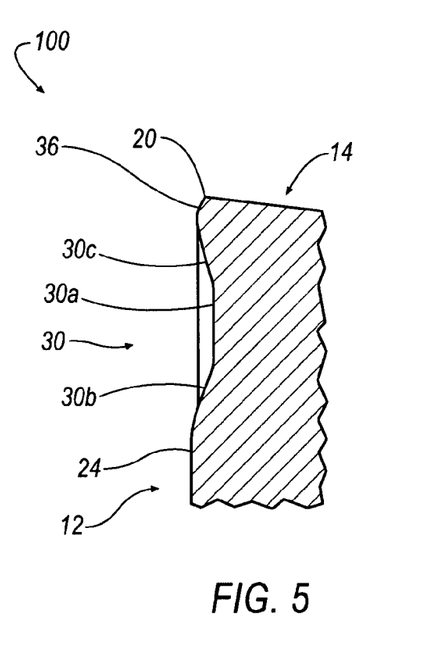
FIG. 5 is a cross-sectional view of the round cutting insert taken along line 5-5 of FIG. 4.

Referring now to FIGS. 4-8, a round cutting insert 100 is shown according to another embodiment of the invention. In this embodiment, the cutting insert 100 is substantially identical to the cutting insert 10, except that the chip control feature of the cutting insert 100 includes the depression 30 in combination with a plurality of chip breaking bumps 102, 104, 106 that bulge or project upwardly from the bottom surface 30a of the depression 30. As used herein, a "bump" is defined as something that bulges out or is protuberant or projects from its surroundings. In the illustrated embodiment, the bumps 102, 104, 106 form a grouping 108 of three bumps that are mirror symmetric with respect to a grouping 110 of another three bumps. For example, the groupings 108, 110 are mirror symmetric about the line designated at 120. As shown in FIG. 4, the cutting insert 100 includes a total of six groupings 108 and six groupings 110, thereby providing a cutting insert that can be indexed in both left-handed and right-handed machining operations. It will be appreciated that the invention is not limited by the number of bumps in the groupings 108, 110, so long as there are at least two bumps in each grouping.

As seen in FIG. 4, the bumps 102, 104, 106 in the grouping 108 are radially offset with respect to each other. That is, a forward end 112 of the bump 102 is located more radially outward (nearer to the cutting edge 20) at a distance D1 from the cutting edge 20 than the forward ends 114, 116 of the bumps 104, 106, respectively. The bump 104 is located more radially outward at a distance D2 than the bump 106, but is located more radially inward than the bump 102. Thus, the bump 106 is located more radially inward at a distance D3 than the bumps 102, 104. The forward ends 112, 114, 116 provide a contact point at which the chip impacts each bump 102, 104, 106, respectively. As the chip successively impacts the radially offset contact points at the forward ends 112, 114, 116 of grouping 108, the bumps 102, 104, 106 as the chip flow across the top surface 12 of the cutting insert 100 in the direction of the arrow 118, the bumps 102, 104, 106 obstructs the chip flow and cause the chip to become corrugated in shape. Conversely, the radially offset bumps in grouping 110 cause the chip to become corrugated as the chip flows across the top surface 12 of the cutting insert 100 in a direction opposite to the arrow 118.

In the illustrated embodiment, the centerlines 122, 124, 126 of the chips 102, 104, 106 of grouping 108 are generally equidistant from each other. However, it will be appreciated that the invention can be practiced in which the centerlines 122, 124, 126 of the chips 102, 104, 106 are not equidistant from each other. For example, the centerlines 122, 124 of the bumps 102, 104 may be equidistant to each other, whereas the centerline 126 of the bump 106 is closer or more distant to the centerline 124 of the bump 104. As will be appreciated, other variations of the distance between the bumps 102, 104, 106 of each grouping 108, 110 are within the spirit and scope of the invention.

Figure 6:
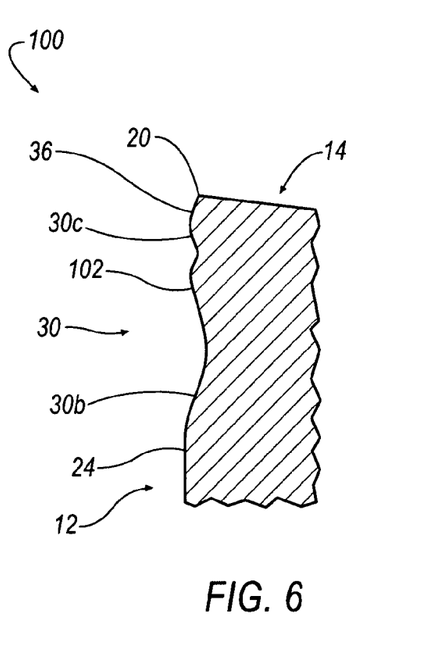
FIG. 6 is a cross-sectional view of the round cutting insert taken along line 6-6 of FIG. 4.
Figure 7:
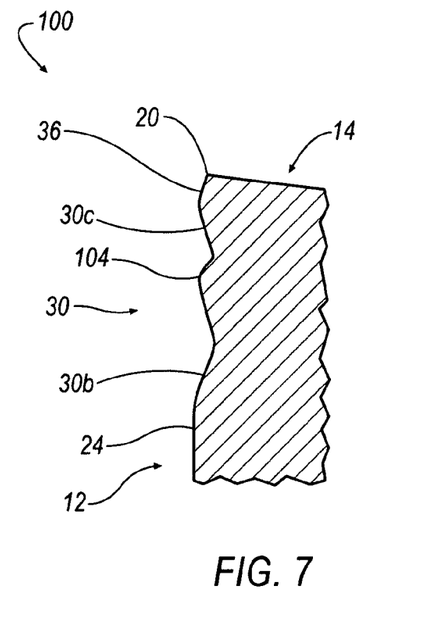
FIG. 7 is a cross-sectional view of the round cutting insert taken along line 7-7 of FIG. 4.
Figure 8:
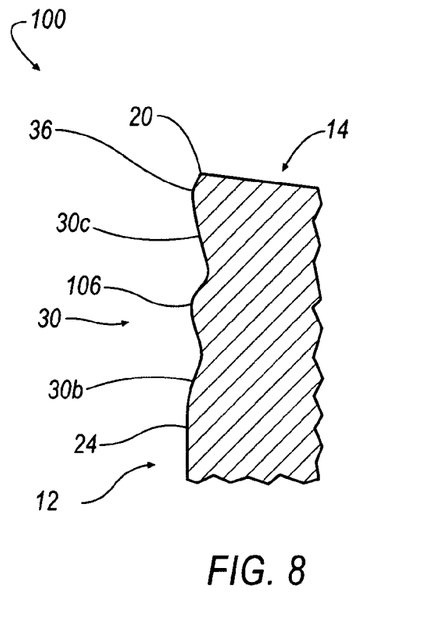
FIG. 8 is a cross-sectional view of the round cutting insert taken along line 8-8 of FIG. 4.

The bumps 102, 104, 106 may be the same in size and shape, or they may be different sizes and shapes. In the illustrated embodiment in FIG. 4, the bumps 102, 104, 106 are substantially identical in shape, but different in size. Specifically, the bump 102 is larger than the bumps 104, 106 to provide improved chip breakage at smaller depth of cut. The bump 104 is larger in size than the bump 106, but smaller in size than the bump 102 to provide improved chip breakage at larger depth of cut. Thus, the bump 106 is smaller in size than the bumps 102, 104 to provide improved chip breakage at even larger depth of cut. The shape of the bumps 102, 104, 106 may be round, oblong, polygonal, conical, teardrop, and the like. The bumps 102, 104, 106 may be symmetrical or asymmetrical in shape. In the illustrated embodiment, the bumps 102, 104, 106 have a generally asymmetrical conical or teardrop shape, as shown in FIGS. 6-8, for improved chip breakage. It is noted that the indexing marks 26 on the island 24 of the cutting insert 100 have a plurality of different shapes to allow the user greater flexibility in properly aligning or indexing the cutting insert 100 in the toolholder (not shown). In the illustrated embodiment, a total of six (6) indexing marks 26 are symmetrically arranged at intervals of about sixty (60) degrees on the island 24 of the top surface 12.

Figure 9:
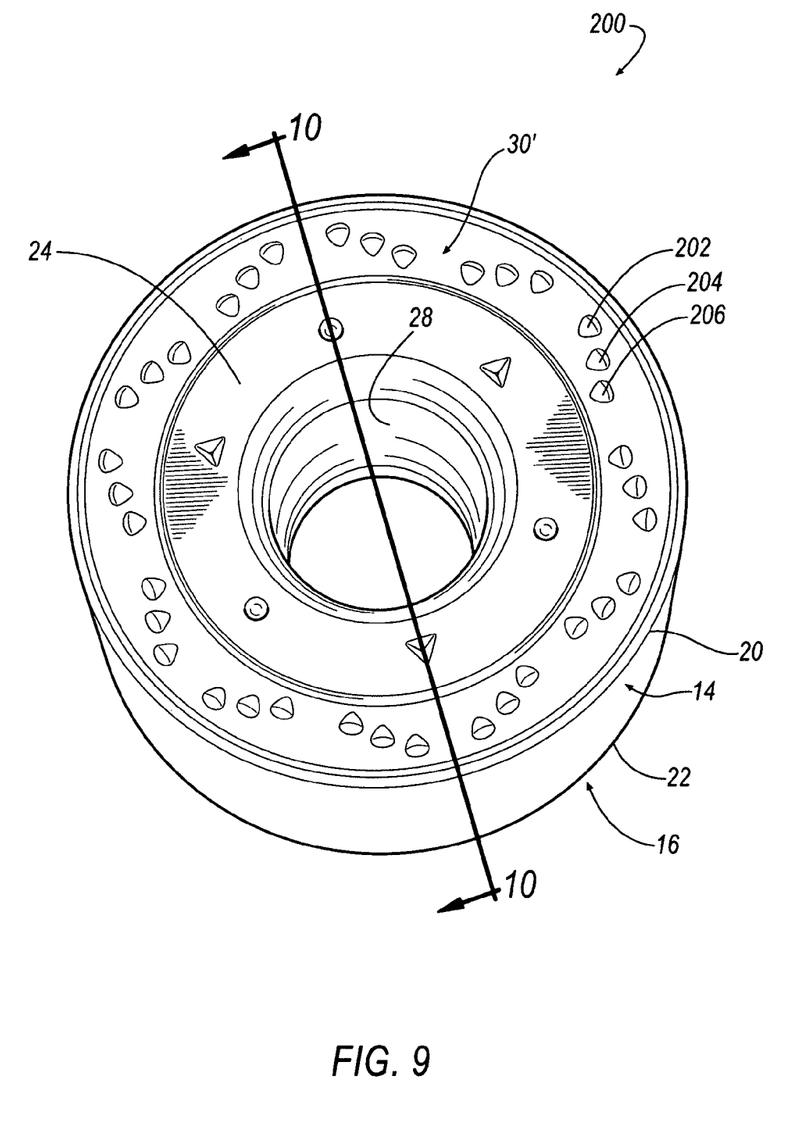
FIG. 9 is a perspective view of a round cutting insert with chip control feature according to another embodiment of the invention.
Figure 10:
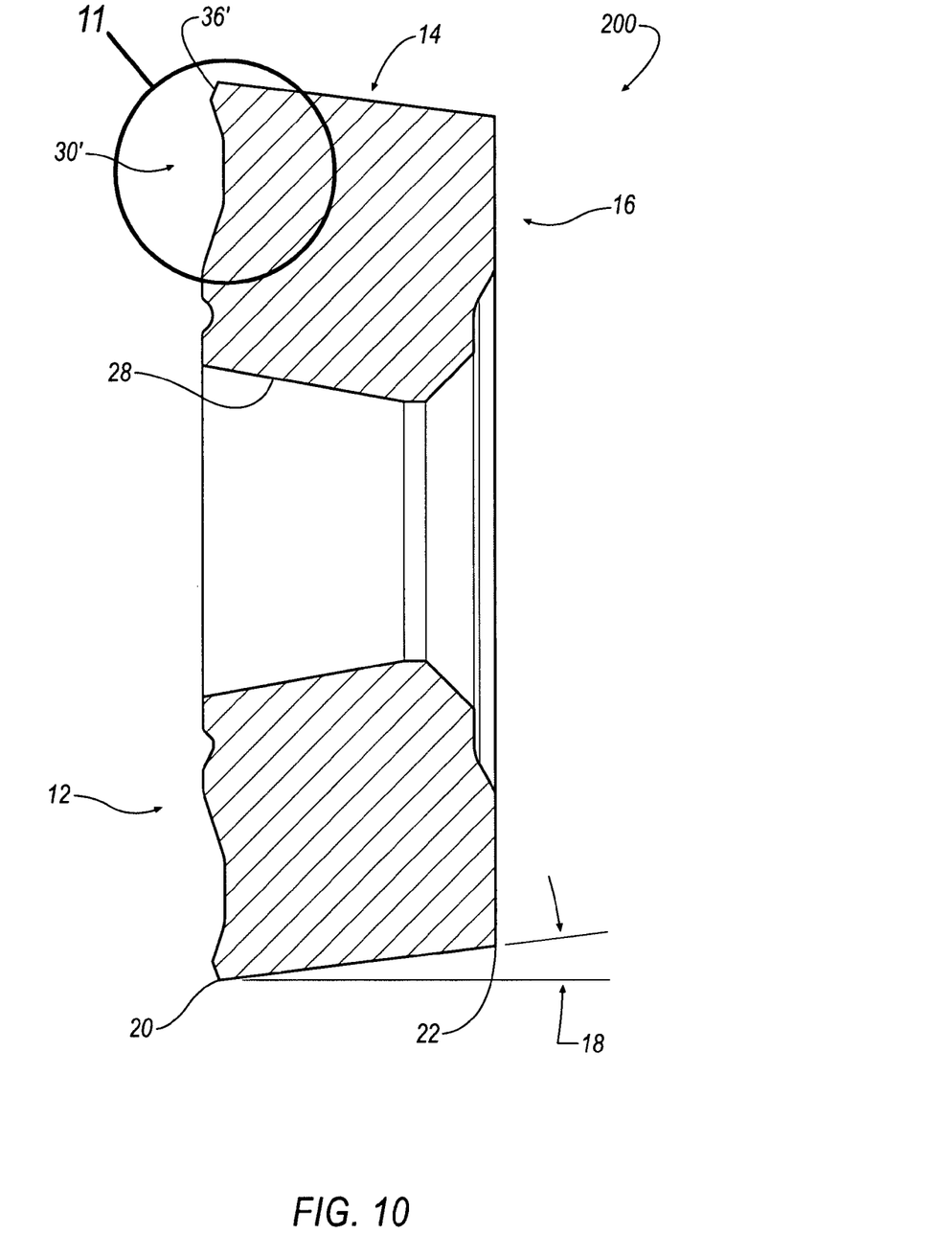
FIG. 10 is a cross-sectional view of the round cutting insert taken along line 10-10 of FIG. 9.
Figure 11:
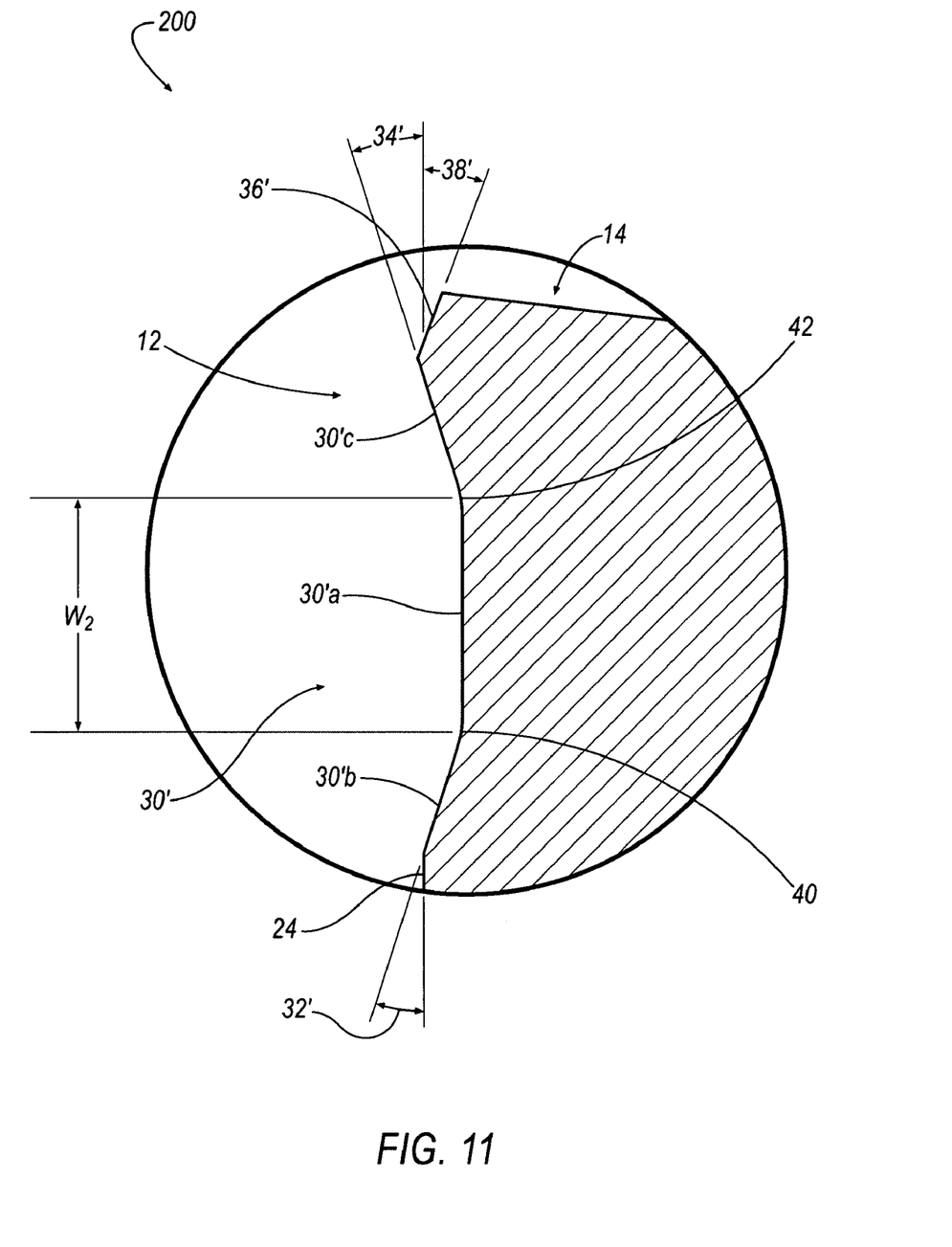
FIG. 11 is an enlarged view of the chip control feature of the round cutting insert of FIG. 9.

Referring now to FIGS. 9-11, a round cutting insert 200 is shown according to another embodiment of the invention. In this embodiment, the cutting insert 200 includes a chip control feature in the form of a depression 30' that is somewhat different than the depression 30 in combination with one or more bumps 202, 204, 206 located in the depression 30'. Specifically, the bottom surface 30'a of the depression 30' has a width W2 that is wider than the width W1 of the depression 30. In addition, the sidewalls 30'b, 30'c of the depression 30' form different, unequal angles 32', 34', respectively, with respect to the top surface 12 as compared the angles 32, 34 formed by the sidewalls 30b, 30c. For example, the angle 32' may be approximately 20 degrees, while the angle 34' may be approximately 18 degrees. In addition, the facet 36' on the top surface 12 of the cutting insert 200 may be wider and form a different angle 38' as compared to the cutting inserts 10, 100. For example, the angle 38' may be approximately 21 degrees, while the angle 38 may be approximately 10 degrees, depending on the particular cutting operation. Another difference between the cutting insert 200 and the cutting insert 100 is that the radially-staggered bumps 202, 204, 206 of the cutting insert 200 are the same shape and the same size, whereas the radially-staggered or radially offset bumps 102, 104, 106 of the cutting insert 100 are the same shape, but different size. In addition, the rear end of each bump 102, 104, 106 (the end opposite the forward end 112, 114, 116) is different in shape than the rear end of each bump 202, 204, 206. However, the forward end 112, 114, 116 of each bump 102, 104, 106 is approximately the same shape as the forward end of each bump 202, 204, 206.

As described above, a round cutting insert includes a chip control feature in the form of a continuous, circumferential depression that may include one or more bumps that provide additional chip control at various depths of cut.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A round cutting insert, comprising:
   a bottom surface;
   a clearance side surface;
   a top surface including a chip control feature in the form of a continuous, circumferential depression having a plurality of bumps located in the depression;
   a cutting edge formed at an intersection between the top surface and the clearance side surface; and
   a substantially flat downwardly sloping facet interposed between one of the side walls of the depression and the cutting edge, the facet forming an angle with respect to the top surface,
   wherein a first bump is located at a first distance from the cutting edge, and wherein a second bump is located at a second distance from the cutting edge, the second distance being different than the first distance.

2. A cutting insert according to claim 1, wherein at least one bump is different in size than another bump.

3. A cutting insert according to claim 1, wherein the plurality of bumps are teardrop in shape.

4. A cutting insert according to claim 1, wherein the depression comprises a substantially planar bottom surface, and a pair of upward sloping substantially planar side walls, each side wall forming an angle with respect to the top surface.

5. A cutting insert according to claim 4, wherein the angle formed by one side wall is different than the angle formed by the other side wall.

6. A cutting insert according to claim 1, wherein the top surface further comprises an elevated island having one or more indexing marks for indexing the cutting insert.

7. A round cutting insert, comprising:
   a bottom surface;
   a clearance side surface;
   a top surface including a chip control feature in the form of a continuous, circumferential depression comprising a substantially planar bottom surface, and a pair of upward sloping substantially planar side walls, each side wall forming an angle with respect to the top surface, and a plurality of bumps located in the depression, wherein at least one bump is different in size than another bump;
   a cutting edge formed at an intersection between the top surface and the clearance side surface; and
   a substantially flat downwardly sloping facet interposed between one of the side walls of the depression and the cutting edge, the facet forming an angle with respect to the top surface.

8. A cutting insert according to claim 7, wherein a cutting edge formed at an intersection between the top surface and the clearance side surface, and wherein at least one bump is located at a first distance from the cutting edge, and wherein a second bump is located at a second distance from the cutting edge, the second distance being different than the first distance.

9. A cutting insert according to claim 7, wherein the plurality of bumps are teardrop in shape.

10. A cutting insert according to claim 7, wherein the angle formed by one side wall is different than the angle formed by the other side wall.

11. A cutting insert according to claim 7, wherein the top surface further comprises an elevated island having one or more indexing marks for indexing the cutting insert.

12. A round cutting insert, comprising:
    a bottom surface;
    a clearance side surface;
    a top surface including a chip control feature in the form of a continuous, circumferential depression comprising a substantially planar bottom surface, and a pair of upward sloping substantially planar side walls, each side wall forming an angle with respect to the top surface, and a plurality of bumps located in the depression; and
    a substantially flat downwardly sloping facet interposed between one of the side walls of the depression and the cutting edge, the facet forming an angle with respect to the top surface.

13. A cutting insert according to claim 12, wherein at least one bump is different in size than another bump.

14. A cutting insert according to claim 12, wherein the angle formed by one side wall is different than the angle formed by the other side wall.

15. A cutting insert according to claim 12 wherein at least one bump is radially offset with respect to another bump.

16. A cutting insert according to claim 12, wherein at least one bump is different in size than another bump.

* * * * *